US012603910B2

(12) United States Patent
　　Gupta

(10) Patent No.: US 12,603,910 B2
(45) Date of Patent: Apr. 14, 2026

(54) CYBERSECURITY RISK ASSESSMENT AND MITIGATION FOR INDUSTRIAL CONTROL SYSTEMS

(71) Applicant: Honeywell International Inc., Charlotte, NC (US)

(72) Inventor: Tarun Gupta, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 193 days.

(21) Appl. No.: 17/987,487

(22) Filed: Nov. 15, 2022

(65) Prior Publication Data

US 2024/0163304 A1　　May 16, 2024

(51) Int. Cl.
H04L 9/40 (2022.01)
*G05B 19/042* (2006.01)
*G05B 19/418* (2006.01)
*G06F 21/55* (2013.01)

(52) U.S. Cl.
CPC ...... H04L 63/1433 (2013.01); H04L 63/1416 (2013.01); *G05B 19/0428* (2013.01); *G05B 19/41835* (2013.01); *G06F 21/55* (2013.01)

(58) Field of Classification Search
CPC . H04L 63/1433; H04L 63/1416; G06F 21/55; G05B 19/0428; G05B 19/41835
See application file for complete search history.

(56) References Cited

U.S. PATENT DOCUMENTS

| 10,176,320 B1 * | 1/2019 | McMurdie ......... G06Q 10/0635 |
| 2013/0031037 A1 * | 1/2013 | Brandt ................ H04L 63/1408 |
| | | 706/12 |
| 2013/0104236 A1 * | 4/2013 | Ray ......................... H04L 63/20 |
| | | 726/25 |
| 2014/0137257 A1 * | 5/2014 | Martinez ............. H04L 63/1433 |
| | | 726/25 |
| 2014/0337086 A1 * | 11/2014 | Asenjo .................. G06F 3/0635 |
| | | 705/7.28 |
| 2017/0228589 A1 * | 8/2017 | Parapurath ........... G06V 30/413 |

* cited by examiner

*Primary Examiner* — Ellen Tran

(74) *Attorney, Agent, or Firm* — Alston & Bird LLP

(57) ABSTRACT

Various embodiments described herein relate to cybersecurity risk assessment and mitigation for industrial control systems. In an embodiment, a request to perform a cybersecurity assessment of a set of industrial assets is received. Additionally, the set of industrial assets are correlated to industrial asset data associated with the set of industrial assets and a first industrial asset feature set is compared to a cybersecurity rules set to determine a cybersecurity threat level indicator for respective industrial assets from the set of industrial assets. In response to the cybersecurity threat level indicator satisfying a defined criterion, one or more cybersecurity countermeasure actions for the respective industrial assets are then determined based on a comparison between a second industrial asset feature set and a predefined industrial asset feature set for a set of predefined industrial assets associated with one or more predefined cybersecurity countermeasures.

20 Claims, 10 Drawing Sheets

500

COMPUTING DEVICE 402

VISUAL DISPLAY 504

SPEAKER(S) 506

CAMERA(S) 508

MICROPHONE(S) 510

GLOBAL POSITIONING SYSTEM (GPS) DEVICE 512

GYROSCOPE 514

WIRELESS COMMUNICATION DEVICE(S) 516

POWER SUPPLY 518

USER COMPUTING DEVICE SYSTEM 520

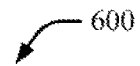
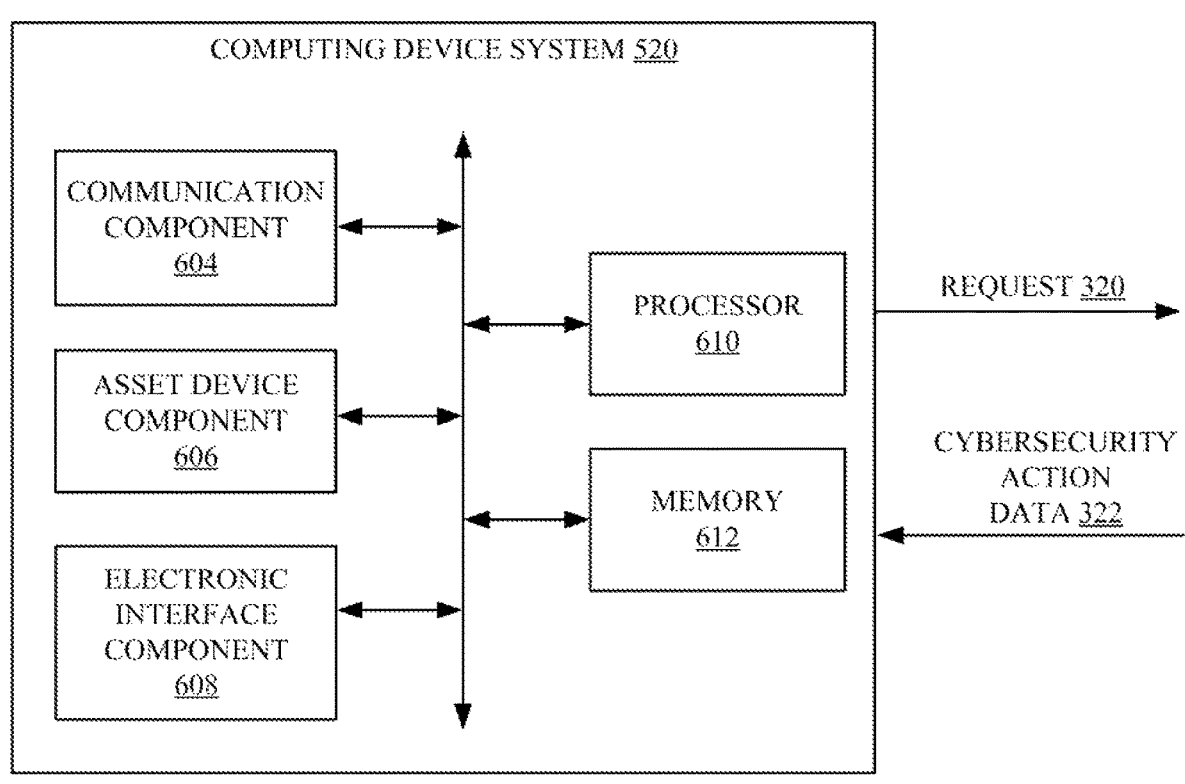
FIG. 6

700

704

INDUSTRIAL ASSET
702b

INDUSTRIAL ASSET
702a

706

708

INDUSTRIAL ASSET
702c

INDUSTRIAL ASSET
702n

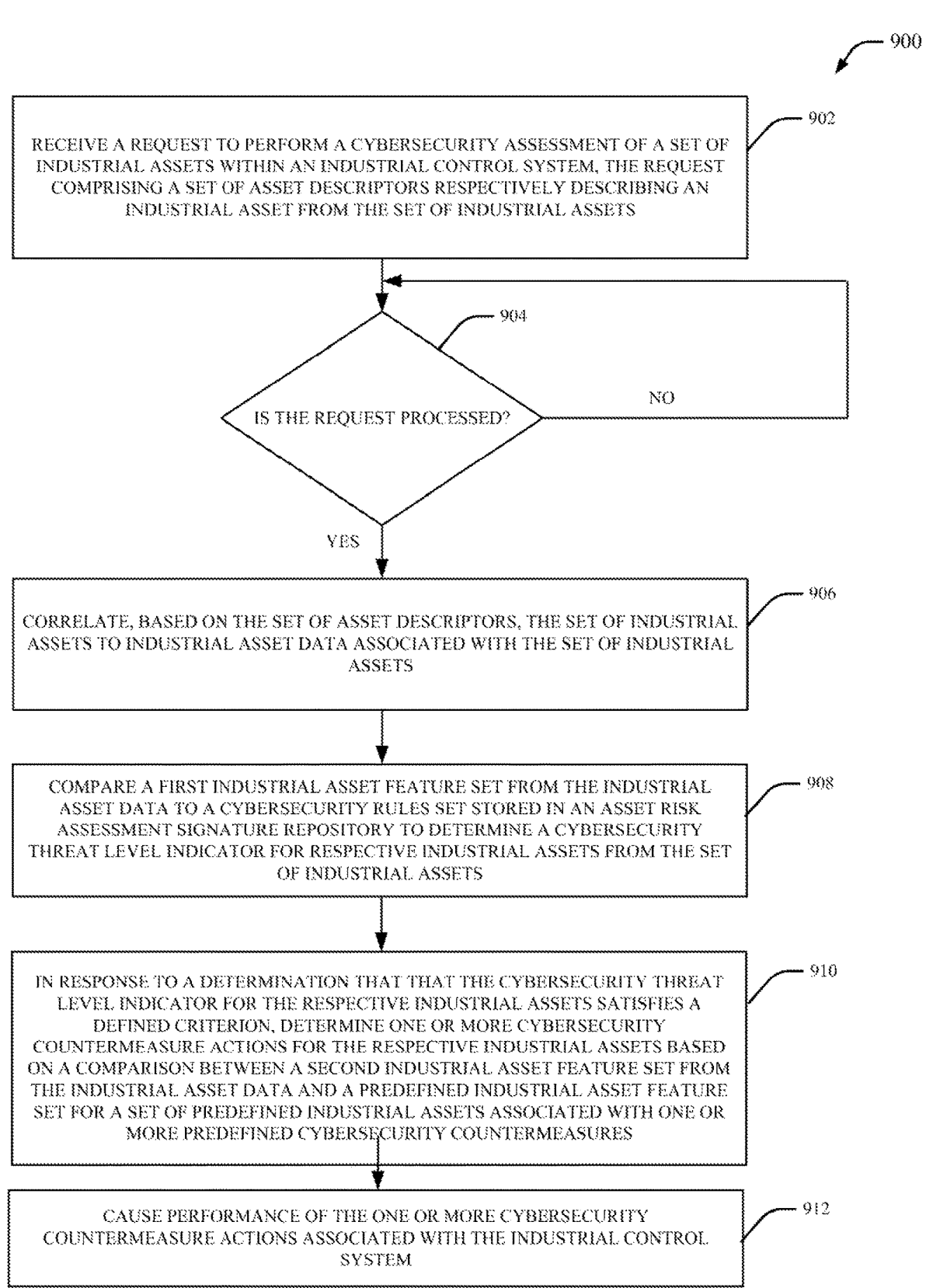

900

RECEIVE A REQUEST TO PERFORM A CYBERSECURITY ASSESSMENT OF A SET OF
INDUSTRIAL ASSETS WITHIN AN INDUSTRIAL CONTROL SYSTEM, THE REQUEST
COMPRISING A SET OF ASSET DESCRIPTORS RESPECTIVELY DESCRIBING AN
INDUSTRIAL ASSET FROM THE SET OF INDUSTRIAL ASSETS

902

904

IS THE REQUEST PROCESSED?

NO

YES

CORRELATE, BASED ON THE SET OF ASSET DESCRIPTORS, THE SET OF INDUSTRIAL
ASSETS TO INDUSTRIAL ASSET DATA ASSOCIATED WITH THE SET OF INDUSTRIAL
ASSETS

906

COMPARE A FIRST INDUSTRIAL ASSET FEATURE SET FROM THE INDUSTRIAL
ASSET DATA TO A CYBERSECURITY RULES SET STORED IN AN ASSET RISK
ASSESSMENT SIGNATURE REPOSITORY TO DETERMINE A CYBERSECURITY
THREAT LEVEL INDICATOR FOR RESPECTIVE INDUSTRIAL ASSETS FROM THE SET
OF INDUSTRIAL ASSETS

908

IN RESPONSE TO A DETERMINATION THAT THAT THE CYBERSECURITY THREAT
LEVEL INDICATOR FOR THE RESPECTIVE INDUSTRIAL ASSETS SATISFIES A
DEFINED CRITERION, DETERMINE ONE OR MORE CYBERSECURITY
COUNTERMEASURE ACTIONS FOR THE RESPECTIVE INDUSTRIAL ASSETS BASED
ON A COMPARISON BETWEEN A SECOND INDUSTRIAL ASSET FEATURE SET FROM
THE INDUSTRIAL ASSET DATA AND A PREDEFINED INDUSTRIAL ASSET FEATURE
SET FOR A SET OF PREDEFINED INDUSTRIAL ASSETS ASSOCIATED WITH ONE OR
MORE PREDEFINED CYBERSECURITY COUNTERMEASURES

910

CAUSE PERFORMANCE OF THE ONE OR MORE CYBERSECURITY
COUNTERMEASURE ACTIONS ASSOCIATED WITH THE INDUSTRIAL CONTROL
SYSTEM

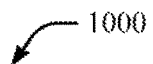
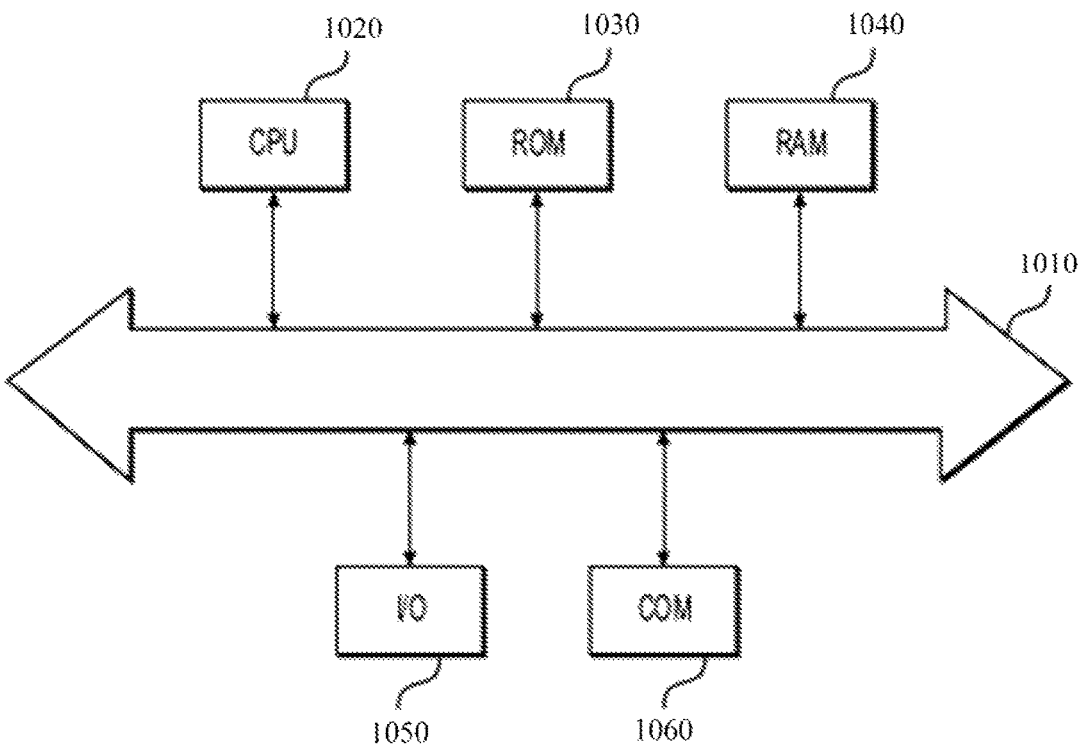
FIG. 10

CYBERSECURITY RISK ASSESSMENT AND MITIGATION FOR INDUSTRIAL CONTROL SYSTEMS

TECHNICAL FIELD

The present disclosure relates generally to industrial network security, and more particularly to cybersecurity risk assessment and mitigation for industrial control systems.

BACKGROUND

An industrial network (e.g., an industrial network associated with industrial automation and control systems) often includes thousands of assets such as, for example, sensors, input/output modules, controllers, firewall devices, supervisory nodes, application nodes, and/or other assets. Furthermore, different assets in an industrial network often include different sets of software and/or different sets of hardware connected to the same network or a different network via switches, routers, firewall devices, etc. As such, there are numerous technical challenges related to performing network security management with respect to an industrial network.

SUMMARY

The details of some embodiments of the subject matter described in this specification are set forth in the accompanying drawings and the description below. Other features, aspects, and advantages of the subject matter will become apparent from the description, the drawings, and the claims.

In an embodiment, a system comprises one or more processors, a memory, and one or more programs stored in the memory. The one or more programs comprise instructions configured to receive a request to perform a cybersecurity assessment of a set of industrial assets within an industrial control system. In one or more embodiments, the request comprises a set of asset descriptors respectively describing an industrial asset from the set of industrial assets. In response to the request, the one or more programs further comprise instructions configured to correlate, based on the set of asset descriptors, the set of industrial assets to industrial asset data associated with the set of industrial assets. Additionally, in response to the request, the one or more more programs further comprise instructions configured to compare a first industrial asset feature set from the industrial asset data to a cybersecurity rules set stored in an asset risk assessment signature repository to determine a cybersecurity threat level indicator for respective industrial assets from the set of industrial assets. In response to the request and a determination that that the cybersecurity threat level indicator for the respective industrial assets satisfies a defined criterion, the one or more programs further comprise instructions configured to determine one or more cybersecurity countermeasure actions for the respective industrial assets based on a comparison between a second industrial asset feature set from the industrial asset data and a predefined industrial asset feature set for a set of predefined industrial assets associated with one or more predefined cybersecurity countermeasures. Furthermore, in response to the request, the one or more programs further comprise instructions configured to cause performance of the one or more cybersecurity countermeasure actions associated with the industrial control system.

In another embodiment, a computer-implemented method comprises receiving a request to perform a cybersecurity assessment of a set of industrial assets within an industrial control system. In one or more embodiments, the request comprises a set of asset descriptors respectively describing an industrial asset from the set of industrial assets. In response to the request, the computer-implemented method also comprises comparing a first industrial asset feature set from the industrial asset data to a cybersecurity rules set stored in an asset risk assessment signature repository to determine a cybersecurity threat level indicator for respective industrial assets from the set of industrial assets. Additionally, in response to the request and a determination that that the cybersecurity threat level indicator for the respective industrial assets satisfies a defined criterion, the computer-implemented method also comprises determining one or more cybersecurity countermeasure actions for the respective industrial assets based on a comparison between a second industrial asset feature set from the industrial asset data and a predefined industrial asset feature set for a set of predefined industrial assets associated with one or more predefined cybersecurity countermeasures. In response to the request, the computer-implemented method also comprises causing performance of the one or more cybersecurity countermeasure actions associated with the industrial control system.

In yet another embodiment, a computer program product comprises at least one computer-readable storage medium having program instructions embodied thereon. The program instructions are executable by a processor to cause the processor to receive a request to perform a cybersecurity assessment of a set of industrial assets within an industrial control system. In one or more embodiments, the request comprises a set of asset descriptors respectively describing an industrial asset from the set of industrial assets. In response to the request, the program instructions further cause the processor to correlate, based on the set of asset descriptors, the set of industrial assets to industrial asset data associated with the set of industrial assets. Additionally, in response to the request, the program instructions further cause the processor to compare a first industrial asset feature set from the industrial asset data to a cybersecurity rules set stored in an asset risk assessment signature repository to determine a cybersecurity threat level indicator for respective industrial assets from the set of industrial assets. In response to the request and a determination that that the cybersecurity threat level indicator for the respective industrial assets satisfies a defined criterion, the program instructions further cause the processor to determine one or more cybersecurity countermeasure actions for the respective industrial assets based on a comparison between a second industrial asset feature set from the industrial asset data and a predefined industrial asset feature set for a set of predefined industrial assets associated with one or more predefined cybersecurity countermeasures. Furthermore, in response to the request, the program instructions further cause the processor to cause performance of the one or more cybersecurity countermeasure actions associated with the industrial control system.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements.

Embodiments incorporating teachings of the present disclosure are shown and described with respect to the figures presented herein, in which:

FIG. 6 illustrates an exemplary user computing device system, in accordance with one or more embodiments described herein;

FIG. 9 illustrates a flow diagram for cybersecurity risk assessment and mitigation for industrial control systems, in accordance with one or more embodiments described herein; and FIG. 10 illustrates a functional block diagram of a computer that may be configured to execute techniques described in accordance with one or more embodiments described herein.

DETAILED DESCRIPTION

Figure 1:
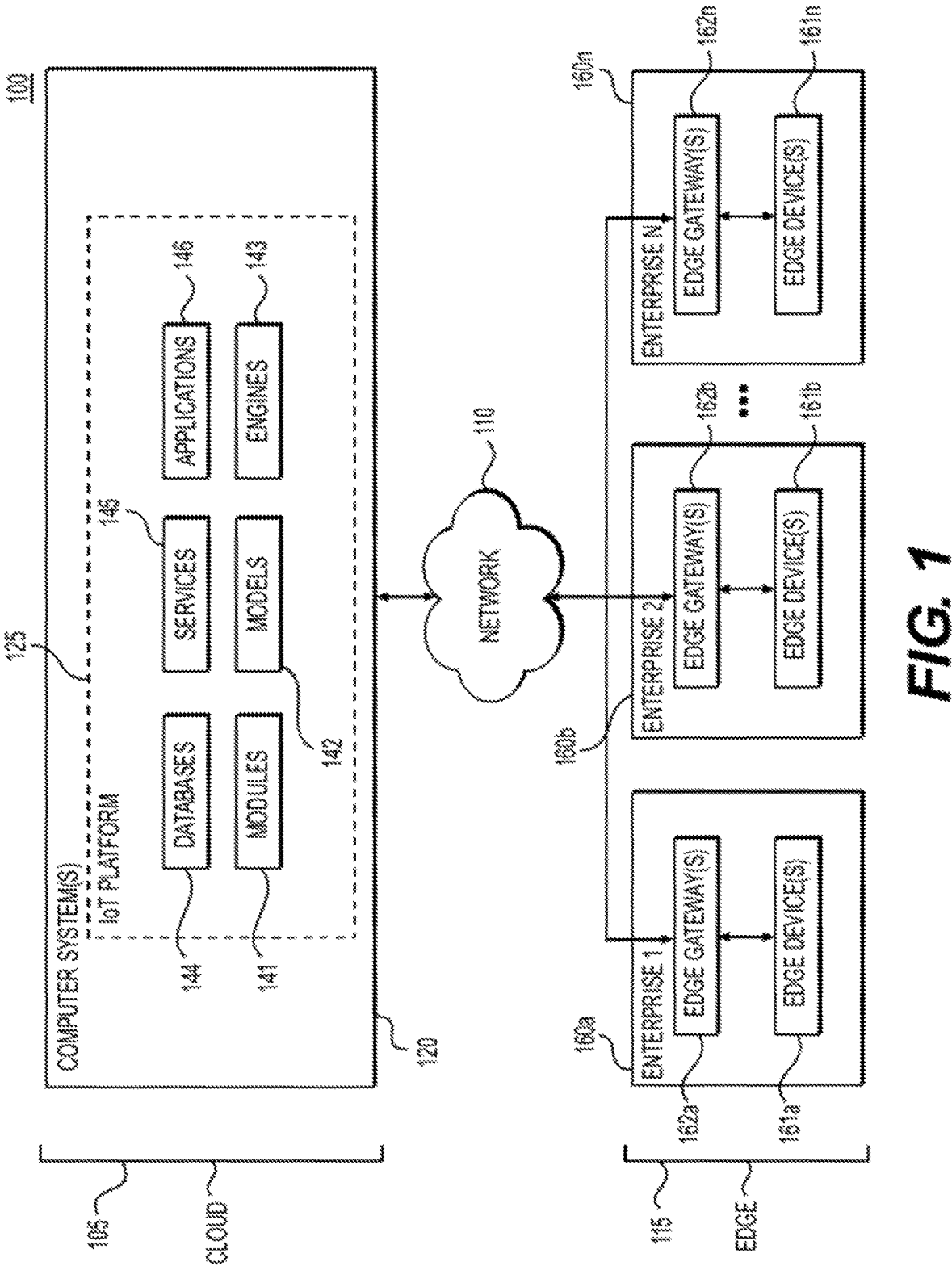
FIG. 1 illustrates an exemplary networked computing system environment, in accordance with one or more embodiments described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

In general, the present disclosure provides for an "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, assets, people, and safety. Further, the IoT platform of the present disclosure supports end-to-end capability to execute digital twins against process data and to translate the output into actionable insights, as detailed in the following description.

An industrial network (e.g., an industrial network associated with industrial automation and control systems) often includes thousands of assets such as, for example, sensors, input/output modules, controllers, firewall devices, supervisory nodes, application nodes, and/or other assets. Furthermore, different assets in an industrial network often include different sets of software and/or different sets of hardware connected to the same network or a different network via switches, routers, firewall devices, etc. As such, there are numerous technical challenges related to performing network security management with respect to an industrial network.

In an example, an infrastructure of a process industry plant such as a petrochemical plant, an oil and gas refinery, a pharmaceutical plan, a food and beverage plant, a fertilizer plant, a power plant, or another type of industrial plant is generally susceptible to a cyberattack via an industrial automation system and/or a control system of the industrial plant. An industrial automation system and/or a control system of an industrial plant is generally directly or indirectly connected to information technology networks such as a main control room for the industrial plant, a satellite rack room for the industrial plant, a plant network of the industrial plant, the Internet. As such, cyber attackers often exploit an industrial automation system and/or a control system of an industrial plant to take advantage of known and/or newly discovered infrastructure vulnerabilities of the industrial plant. Unlike computers and/or other computing devices implemented via an internet technology network, portions of an industrial automation system and/or a control system of an industrial plant generally include a distributed control system, process controllers, programmable logic controllers, supervisory control and data acquisition systems, computing stations (e.g., consoles, human-machine interfaces, etc.) and/or another type of system configured for process control functionalities with respect to the industrial plant. The portions of the industrial plant associated with process control functionalities is therefore generally susceptible to a cyberattack.

Thus, to address these and/or other issues, cybersecurity risk assessment and mitigation for industrial control systems is provided. In various embodiments, industrial assets in an industrial network are identified, a cybersecurity threat related to respective industrial assets is analyzed, a risk assessment with respect to the respective cybersecurity threats is performed, and/or one or more countermeasures for the respective cybersecurity threats are determined based on the risk assessments. The one or more countermeasures can also be executed to mitigate the cybersecurity risk with respect to the industrial network. In various embodiments, the one or more countermeasures can include one or more recommended network architectures and/or one or more industrial network changes to mitigate the cybersecurity risk.

In one or more embodiments, a request to perform a cybersecurity assessment of a set of industrial assets within an industrial control system is received. The request includes a set of asset descriptors respectively describing an industrial asset from the set of industrial assets. In response to the request, the set of asset descriptors is correlated to industrial asset data associated with the set of industrial assets based on the set of asset descriptors. Additionally, a first industrial asset feature set from the industrial asset data is compared to a cybersecurity rules set stored in an asset risk assessment signature repository to determine a cybersecurity threat level indicator for respective industrial assets from the set of industrial assets. In response to a determination that that the cybersecurity threat level indicator for the respective industrial assets satisfies a defined criterion, one or more cybersecurity countermeasure actions for the respective industrial assets are determined based on a comparison between a second industrial asset feature set from the industrial asset data and a predefined industrial asset feature set for a set of predefined industrial assets associated with one or more predefined cybersecurity countermeasures. Additionally, performance of the one or more cybersecurity countermeasure actions associated with the industrial control system is caused.

Accordingly, with the cybersecurity risk assessment and mitigation disclosed herein, likelihood of a cyberattack with respect to a network (e.g., an industrial network) is reduced. Moreover, with the cybersecurity risk assessment and mitigation disclosed herein, performance of a network (e.g., an industrial network) and/or assets within a network are improved. For instance, by employing one or more techniques disclosed herein, network performance, asset performance and/or process performance is optimized. Additionally, performance of a processing system associated with cybersecurity vulnerability assessment of assets is improved by employing one or more techniques disclosed herein. For example, a number of computing resources, a number of a storage requirements, and/or number of errors associated with cybersecurity vulnerability assessment of assets is reduced by employing one or more techniques disclosed herein.

FIG. 1 illustrates an exemplary networked computing system environment 100, according to the present disclosure. As shown in FIG. 1, networked computing system environment 100 is organized into a plurality of layers including a cloud layer 105, a network layer 110, and an edge layer 115. As detailed further below, components of the edge 115 are in communication with components of the cloud 105 via network 110.

In various embodiments, network 110 is any suitable network or combination of networks and supports any appropriate protocol suitable for communication of data to and from components of the cloud 105 and between various other components in the networked computing system environment 100 (e.g., components of the edge 115). According to various embodiments, network 110 includes a public network (e.g., the Internet), a private network (e.g., a network within an organization), or a combination of public and/or private networks. According to various embodiments, network 110 is configured to provide communication between various components depicted in FIG. 1. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, in various embodiments, computer systems 120 includes any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, in an embodiment, the processors and data storage devices comprise any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory), as detailed with respect to FIG. 2 below. According to various embodiments, the one or more processors are configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 100 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the result(s) to the users. According to various embodiments, computer systems 120 are part of an entity which include any type of company, organization, or institution that implements one or more IoT services. In some examples, the entity is an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or entity that includes any number of local devices.

Figure 2:
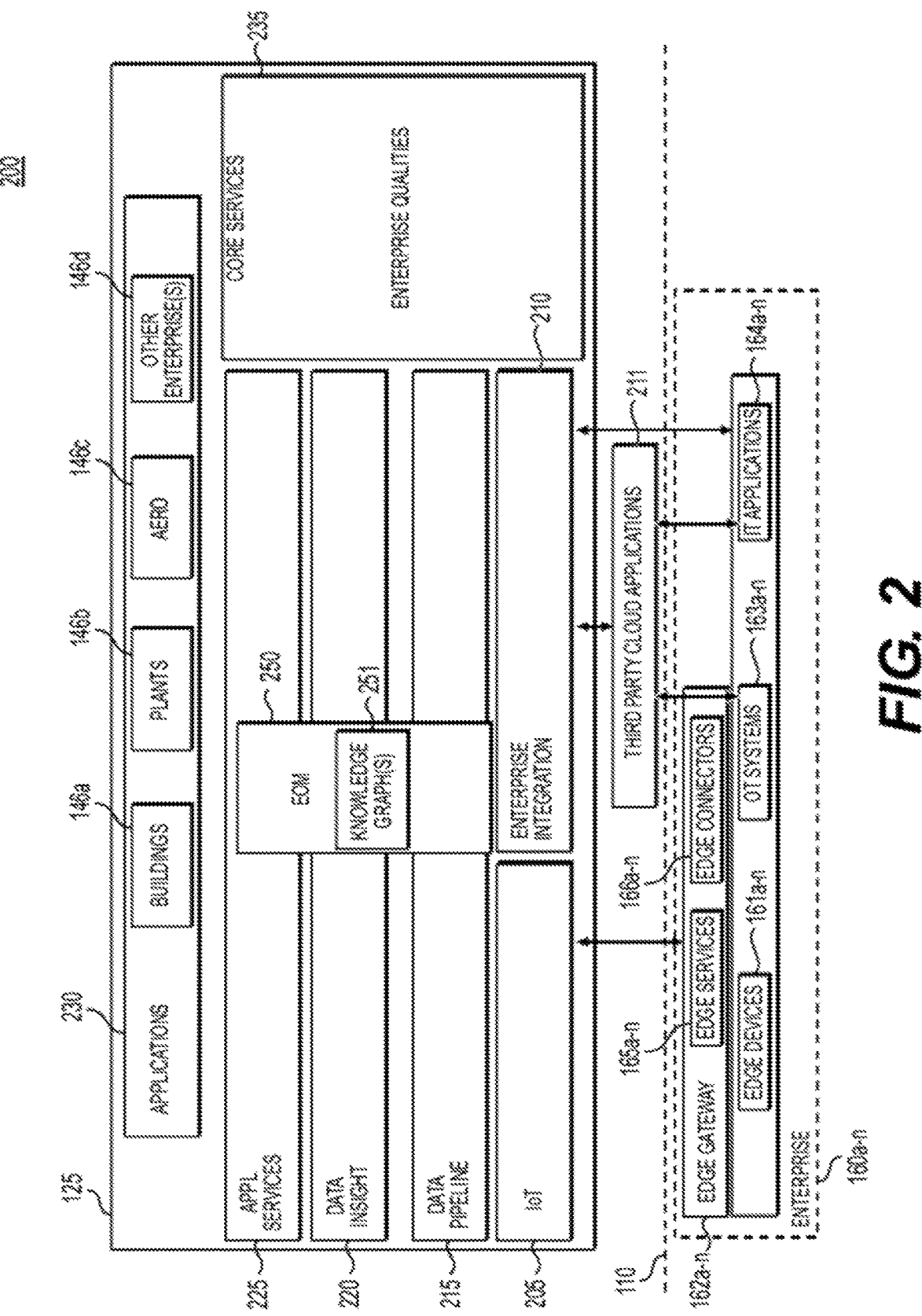
FIG. 2 illustrates a schematic block diagram of a framework of an IoT platform of the networked computing system, in accordance with one or more embodiments described herein.

According to various embodiments, the edge devices 161a-161n represent any of a variety of different types of devices that may be found within the enterprises 160a-160n. Edge devices 161a-161n are any type of device configured to access network 110, or be accessed by other devices through network 110, such as via an edge gateway 162a-162n. According to various embodiments, edge devices 161a-161n are "IoT devices" which include any type of network-connected (e.g., Internet-connected) device. For example, in one or more embodiments, the edge devices 161a-161n include assets, sensors, actuators, processors, computers, valves, pumps, ducts, vehicle components, cameras, displays, doors, windows, security components, boilers, chillers, pumps, HVAC components, factory equipment, and/or any other devices that are connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, in one or more embodiments, the edge 115 include operational technology (OT) systems 163a-163n and information technology (IT) applications 164a-164n of each enterprise 161a-161n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, WiFi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication are achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 162a-162n also include a processor and memory for storing and executing program instructions to facilitate data processing. For example, in one or more embodiments, the edge gateways 162a-162n are configured to receive data from the edge devices 161a-161n and process the data prior to sending the data to the cloud 105. Accordingly, in one or more embodiments, the edge gateways 162a-162n include one or more software modules or components for providing data processing services and/or other services or methods of the present disclosure. With reference to FIG. 2, each edge gateway 162a-162n includes edge services 165a-165n and edge connectors 166a-166n. According to various embodiments, the edge services 165a-165n include hardware and software components for processing the data from the edge devices 161a-161n. According to various embodiments, the edge connectors 166a-166n include hardware and software components for facilitating communication between the edge gateway 162a-162n and the cloud 105 via network 110, as detailed above. In some cases, any of edge devices 161a-n, edge connectors 166a-n, and edge gateways 162a-n have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations and/or analytics for sustained peak performance of the enterprise 160a-160n. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, in one or more embodiments, each layer 205-235 includes one or more of the modules 141, models 142, engines 143, databases 144, services 145, applications 146, or combinations thereof. In some embodiments, the layers 205-235 are combined to form fewer layers. In some embodiments, some of the layers 205-235 are separated into separate, more numerous layers. In some embodiments, some of the layers 205-235 are removed while others may be added.

The IoT platform 125 is a model-driven architecture. Thus, the extensible object model 250 communicates with each layer 205-230 to contextualize site data of the enterprise 160a-160n using an extensible graph based object model (or "asset model"). In one or more embodiments, the extensible object model 250 is associated with knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 include resource description framework (RDF) graphs. As used herein, a "RDF graph" is a graph data model that formally describes the semantics, or meaning, of information. The RDF graph also represents metadata (e.g., data that describes data). According to various embodiments, knowledge graphs 251 also include a semantic object model. The semantic object model is a subset of a knowledge graph 251 that defines semantics for the knowledge graph 251. For example, the semantic object model defines the schema for the knowledge graph 251.

As used herein, EOM 250 includes a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 161a-161n) and the type of data that is being sensed by each sensor. According to various embodiments, a KPI framework is used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute is configured either as a static value (e.g., capacity is 1000 BPH) or with a reference to a time series tag that provides the value. The knowledge graph 250 can automatically map the tag to the attribute based on naming conventions, parsing, and matching the tag and attribute descriptions and/or by comparing the behavior of the time series data with expected behavior. In one or more embodiments, each of the key attribute contributing to one or more metrics to drive a dashboard is marked with one or more metric tags such that a dashboard visualization is generated.

The modeling phase includes an onboarding process for syncing the models between the edge 115 and the cloud 105. For example, in one or more embodiments, the onboarding process includes a simple onboarding process, a complex onboarding process, and/or a standardized rollout process. The simple onboarding process includes the knowledge graph 250 receiving raw model data from the edge 115 and running context discovery algorithms to generate the model. The context discovery algorithms read the context of the edge naming conventions of the edge devices 161a-161n and determine what the naming conventions refer to. For example, in one or more embodiments, the knowledge graph 250 receives "TMP" during the modeling phase and determine that "TMP" relates to "temperature." The generated models are then published. The complex onboarding process includes the knowledge graph 250 receiving the raw model data, receiving point history data, and receiving site survey data. According to various embodiments, the knowledge graph 250 then uses these inputs to run the context discovery algorithms. According to various embodiments, the generated models are edited and then the models are published. The standardized rollout process includes manually defining standard models in the cloud 105 and pushing the models to the edge 115.

The IoT layer 205 includes one or more components for device management, data ingest, and/or command/control of the edge devices 161*a*-161*n*. The components of the IoT layer 205 enable data to be ingested into, or otherwise received at, the IoT platform 125 from a variety of sources. For example, in one or more embodiments, data is ingested from the edge devices 161*a*-161*n* through process historians or laboratory information management systems. The IoT layer 205 is in communication with the edge connectors 165*a*-165*n* installed on the edge gateways 162*a*-162*n* through network 110, and the edge connectors 165*a*-165*n* send the data securely to the IoT platform 205. In some embodiments, only authorized data is sent to the IoT platform 125, and the IoT platform 125 only accepts data from authorized edge gateways 162*a*-162*n* and/or edge devices 161*a*-161*n*. According to various embodiments, data is sent from the edge gateways 162*a*-162*n* to the IoT platform 125 via direct streaming and/or via batch delivery. Further, after any network or system outage, data transfer will resume once communication is re-established and any data missed during the outage will be backfilled from the source system or from a cache of the IoT platform 125. According to various embodiments, the IoT layer 205 also includes components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163*a*-163*n* and IT applications 164*a*-164*n* of the enterprise 160*a*-160*n*. Thus, the enterprise integration layer 210 enables the IoT platform 125 to receive data from the third-party applications 211 rather than, or in combination with, receiving the data from the edge devices 161*a*-161*n* directly.

The data pipeline layer 215 includes one or more components for data cleansing/enriching, data transformation, data calculations/aggregations, and/or API for data streams. Accordingly, in one or more embodiments, the data pipeline layer 215 pre-processes and/or performs initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. According to various embodiments, the enterprise-specific digital twins include a reliability advisor containing process models to determine the current operation and the fault models to trigger any early detection and determine an appropriate resolution.

According to various embodiments, the digital twins also include an optimization advisor that integrates real-time economic data with real-time process data, selects the right feed for a process, and determines optimal process conditions and product yields.

According to various embodiments, the data pipeline layer 215 employs models and templates to define calculations and analytics. Additionally or alternatively, according to various embodiments, the data pipeline layer 215 employs models and templates to define how the calculations and analytics relate to the assets (e.g., the edge devices 161*a*-161*n*). For example, in an embodiment, a pump template defines pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 161*a*-161*n*) instance is created, any associated calculation instances are also created with their input and output parameters linked to the appropriate attributes of the asset (e.g., edge device 161*a*-161*n*).

According to various embodiments, the IoT platform 125 supports a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160*a*-160*n* performance to identify issues or opportunities, and the potential causes or drivers of the issues or opportunities. The IoT platform 125 includes rich hierarchical symptom-fault models to identify abnormal conditions and their potential consequences. For example, in one or more embodiments, the IoT platform 125 drill downs from a high-level condition to understand the contributing factors, as well as determining the potential impact a lower level condition may have. There may be multiple fault models for a given enterprise 160*a*-160*n* looking at different aspects such as process, equipment, control, and/or operations. According to various embodiments, each fault model identifies issues and opportunities in their domain, and can also look at the same core problem from a different perspective. According to various embodiments, an overall fault model is layered on top to synthesize the different perspectives from each fault model into an overall assessment of the situation and point to the true root cause.

According to various embodiments, when a fault or opportunity is identified, the IoT platform 125 provides recommendations about an optimal corrective action to take. Initially, the recommendations are based on expert knowledge that has been pre-programmed into the system by process and equipment experts. A recommendation services module presents this information in a consistent way regardless of source, and supports workflows to track, close out, and document the recommendation follow-up. According to various embodiments, the recommendation follow-up is employed to improve the overall knowledge of the system over time as existing recommendations are validated (or not) or new cause and effect relationships are learned by users and/or analytics.

According to various embodiments, the models are used to accurately predict what will occur before it occurs and interpret the status of the installed base. Thus, the IoT platform 125 enables operators to quickly initiate maintenance measures when irregularities occur. According to various embodiments, the digital twin architecture of the IoT platform 125 employs a variety of modeling techniques. According to various embodiments, the modeling techniques include, for example, rigorous models, fault detection and diagnostics (FDD), descriptive models, predictive maintenance, prescriptive maintenance, process optimization, and/or any other modeling technique.

According to various embodiments, the rigorous models are converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various embodiments, the descriptive models identifies a problem and the predictive models determines possible damage levels and maintenance options. According to various embodiments, the descriptive models include models for defining the operating windows for the edge devices 161*a*-161*n*.

Predictive maintenance includes predictive analytics models developed based on rigorous models and statistic models, such as, for example, principal component analysis (PCA) and partial least square (PLS). According to various embodiments, machine learning methods are applied to train models for fault prediction. According to various embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various embodiments, prescriptive analysis selects the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. According to various embodiments, when raw data is received at the IoT platform 125, the raw data is stored as time series tags or events in warm storage (e.g., in a TSDB) to support interactive queries and to cold storage for archive purposes. According to various embodiments, data is sent to the data lakes for offline analytics development. According to various embodiments, the data pipeline layer 215 accesses the data stored in the databases of the data insight layer 220 to perform analytics, as detailed above.

The application services layer 225 includes one or more components for rules engines, workflow/notifications, KPI framework, insights (e.g., actionable insights), decisions, recommendations, machine learning, and/or an API for application services. The application services layer 225 enables building of applications 146*a-d*. The applications layer 230 includes one or more applications 146*a-d* of the IoT platform 125. For example, according to various embodiments, the applications 146*a-d* includes a buildings application 146*a*, a plants application 146*b*, an aero application 146*c*, and other enterprise applications 146*d*. According to various embodiments, the applications 146 includes general applications 146 for portfolio management, asset management, autonomous control, and/or any other custom applications. According to various embodiments, portfolio management includes the KPI framework and a flexible user interface (UI) builder. According to various embodiments, asset management includes asset performance and asset health. According to various embodiments, autonomous control includes energy optimization and/or predictive maintenance. As detailed above, according to various embodiments, the general applications 146 is extensible such that each application 146 is configurable for the different types of enterprises 160*a*-160*n* (e.g., buildings application 146*a*, plants application 146*b*, aero application 146*c*, and other enterprise applications 146*d*).

The applications layer 230 also enables visualization of performance of the enterprise 160*a*-160*n*. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. According to various embodiments, the core services 235 include data visualization, data analytics tools, security, scaling, and monitoring. According to various embodiments, the core services 235 also include services for tenant provisioning, single login/common portal, self-service admin, UI library/UI tiles, identity/access/entitlements, logging/monitoring, usage metering, API gateway/dev portal, and the IoT platform 125 streams.

Figure 3:
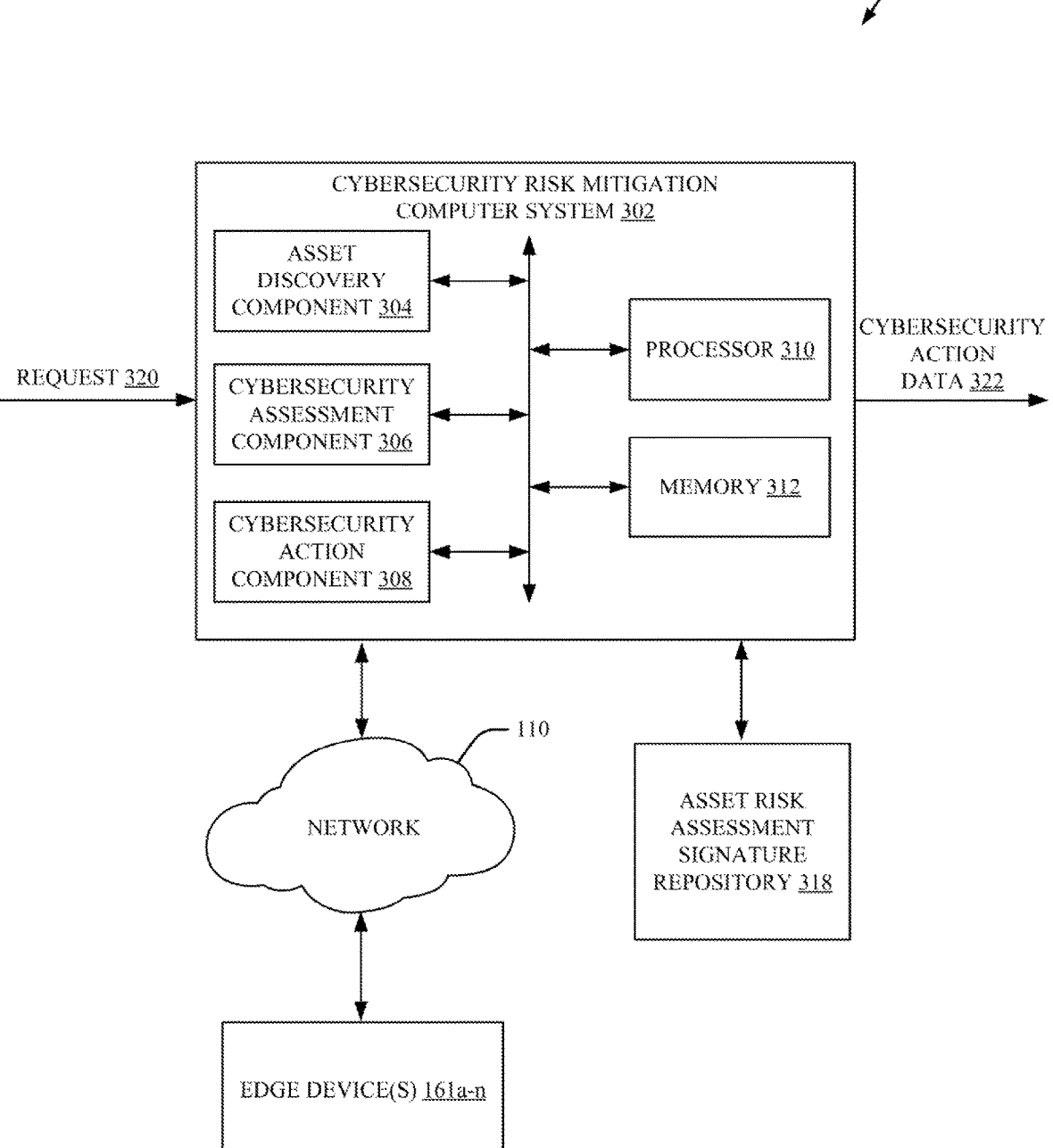
FIG. 3 illustrates a system that provides an exemplary environment, in accordance with one or more embodiments described herein.

FIG. 3 illustrates a system 300 that provides an exemplary environment according to one or more described features of one or more embodiments of the disclosure. According to an embodiment, the system 300 includes a cybersecurity risk mitigation computer system 302 to facilitate a practical application of cybersecurity assessment with respect to assets within a network. In one or more embodiments, the cybersecurity risk mitigation computer system 302 facilitates a practical application of monitoring network traffic broadcasted to the assets and/or based on responses from the assets to facilitate cybersecurity risk assessment with respect to assets within a network. In one or more embodiments, the cybersecurity risk mitigation computer system 302 stores and/or analyzes asset property data that is aggregated from one or more assets and/or one or more data sources associated with an enterprise system (e.g., a building system, an industrial system or another type of enterprise system).

In an embodiment, the cybersecurity risk mitigation computer system 302 is a server system (e.g., a server device) that facilitates cybersecurity assessment with respect to assets within a network. In another embodiment, the cybersecurity risk mitigation computer system 302 corresponds to and/or is integrated within an edge system (e.g., edge device) that facilitates cybersecurity assessment with respect to assets within a network. In one or more embodiments, the cybersecurity risk mitigation computer system 302 is a device with one or more processors and a memory. In one or more embodiments, the cybersecurity risk mitigation computer system 302 is a computer system from the computer systems 120. For example, in one or more embodiments, the cybersecurity risk mitigation computer system 302 is implemented via the cloud 105. The cybersecurity risk mitigation computer system 302 is also related to one or more technologies, such as, for example, cybersecurity technologies, cybersecurity assessment technologies, industrial technologies, process plant technologies, oil and gas technologies, petrochemical technologies, refinery technologies, process plant technologies, supply chain analytics technologies, enterprise technologies, connected building technologies, industrial technologies, Internet of Things (IoT) technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, aircraft technologies, navigation technologies, asset visualization technologies, procurement technologies, and/or one or more other technologies.

Moreover, the cybersecurity risk mitigation computer system 302 provides an improvement to one or more technologies such as cybersecurity technologies, cybersecurity assessment technologies, industrial technologies, process plant technologies, oil and gas technologies, petrochemical technologies, refinery technologies, process plant technologies, supply chain analytics technologies, enterprise technologies, connected building technologies, industrial technologies, IoT technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, aircraft technologies, navigation technologies, asset visualization technologies, procurement technologies, and/or one or more other technologies. In an implementation, the cybersecurity risk mitigation computer system 302 improves performance of an industrial network, an industrial control system, and/or one or more industrial assets. For example, in one or more embodiments, the cybersecurity risk mitigation computer system 302 improves processing efficiency, reduces power consumption, reduces downtime, and/or mitigates cybersecurity risk for an industrial network, an industrial control system, and/or one or more industrial assets. In another implementation, the cybersecurity risk mitigation computer system 302 improves performance of a computing device. For example, in one or more embodiments, the cybersecurity risk mitigation computer system 302 improves processing efficiency of a computing device (e.g., a server), reduces power consumption of a computing device (e.g., a server), improves quality of data provided by a computing device (e.g., a server), etc.

The cybersecurity risk mitigation computer system 302 includes an asset discovery component 304, a cybersecurity assessment component 306 and/or a cybersecurity action component 308. Additionally, in one or more embodiments, the cybersecurity risk mitigation computer system 302 includes a processor 310 and/or a memory 312. In certain embodiments, one or more aspects of the cybersecurity risk mitigation computer system 302 (and/or other systems, apparatuses and/or processes disclosed herein) constitute executable instructions embodied within a computer-readable storage medium (e.g., the memory 312). For instance, in an embodiment, the memory 312 stores computer executable component and/or executable instructions (e.g., program instructions). Furthermore, the processor 310 facilitates execution of the computer executable components and/or the executable instructions (e.g., the program instructions). In an example embodiment, the processor 310 is configured to execute instructions stored in the memory 312 or otherwise accessible to the processor 310.

The processor 310 is a hardware entity (e.g., physically embodied in circuitry) capable of performing operations according to one or more embodiments of the disclosure. Alternatively, in an embodiment where the processor 310 is embodied as an executor of software instructions, the software instructions configure the processor 310 to perform one or more algorithms and/or operations described herein in response to the software instructions being executed. In an embodiment, the processor 310 is a single core processor, a multi-core processor, multiple processors internal to the cybersecurity risk mitigation computer system 302, a remote processor (e.g., a processor implemented on a server), and/or a virtual machine. In certain embodiments, the processor 310 is in communication with the memory 312, the asset discovery component 304, the cybersecurity assessment component 306 and/or the cybersecurity action component 308 via a bus to, for example, facilitate transmission of data among the processor 310, the memory 312, the asset discovery component 304, the cybersecurity assessment component 306 and/or the cybersecurity action component 308. The processor 310 may be embodied in a number of different ways and, in certain embodiments, includes one or more processing devices configured to perform independently. Additionally or alternatively, in one or more embodiments, the processor 310 includes one or more processors configured in tandem via a bus to enable independent execution of instructions, pipelining of data, and/or multi-thread execution of instructions.

The memory 312 is non-transitory and includes, for example, one or more volatile memories and/or one or more non-volatile memories. In other words, in one or more embodiments, the memory 312 is an electronic storage device (e.g., a computer-readable storage medium). The memory 312 is configured to store information, data, content, one or more applications, one or more instructions, or the like, to enable the cybersecurity risk mitigation computer system 302 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In an embodiment, the cybersecurity risk mitigation computer system 302 (e.g., the asset discovery component 304 of the cybersecurity risk mitigation computer system 302) determines asset property data related to the edge devices 161a-161n. In one or more embodiments, the edge devices 161a-161n are associated with a portfolio of assets. For instance, in one or more embodiments, the edge devices 161a-161n include one or more assets in a portfolio of assets. The edge devices 161a-161n include, in one or more embodiments, one or more databases, one or more assets (e.g., one or more industrial assets, one or more building assets, etc.), one or more IoT devices (e.g., one or more industrial IoT devices), one or more connected building assets, one or more sensors, one or more actuators, one or more processors, one or more computers, one or more valves, one or more pumps (e.g., one or more centrifugal pumps, etc.), one or more motors, one or more compressors, one or more turbines, one or more ducts, one or more heaters, one or more chillers, one or more coolers, one or more storage tanks, one or more boilers, one or more furnaces, one or more heat exchangers, one or more fans, one or more blowers, one or more conveyor belts, one or more vehicle components, one or more cameras, one or more displays, one or more security components, one or more HVAC components, industrial equipment, factory equipment, refinery equipment, and/or one or more other devices that are connected to the network 110 for collecting, sending, and/or receiving information.

In one or more embodiments, the edge device 161a-161n include, or is otherwise in communication with, one or more controllers for selectively controlling a respective edge device 161a-161n and/or for sending/receiving information between the edge devices 161a-161n and the cybersecurity risk mitigation computer system 302 via the network 110. The asset property data includes, for example, an internet protocol (IP) address, a media access control (MAC) address, a hostname, a manufacturer, an operating system, a transmission control protocol (TCP) port, a user datagram protocol (UDP) port, a service, a role, metadata, flow flags, port status (e.g., open state, closed state, etc.), asset state, asset type, asset discovery information, and/or other information associated with one or more edge devices from the edge devices 161a-161n. In one or more embodiments, the asset property data is additionally or alternatively associated with one or more asset processes related to one or more edge devices from the edge devices 161a-161n. For example, in one or more embodiments, the asset property data additionally or alternatively includes data generated by one or more asset processes, data generated by one or more asset processes, and/or other data related to one or more asset processes.

In one or more embodiments, the cybersecurity risk mitigation computer system 302 (e.g., the asset discovery component 304 of the cybersecurity risk mitigation computer system 302) is in communication with the edge devices 161a-161n via the network 110. In one or more embodiments, the network 110 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network. In one or more embodiments, the edge devices 161a-161n are associated with an industrial environment (e.g., a plant, etc.). Additionally or alternatively, in one or more embodiments, the edge devices 161a-161n are associated with components of the edge 115 such as, for example, one or more enterprises 160a-160n.

The asset discovery component 304 is configured for asset discovery to detect one or more assets (e.g., the edge devices 161a-161n) within the network 110. For instance, the asset discovery component 304 is configured to perform one or more asset discovery processes associated with the network 110 to detect the one or more assets (e.g., the edge devices 161a-161n) within the network 110. In an embodiment, the asset discovery component 304 detects one or more assets within a certain IP range of the network 110. In one or more embodiments, the asset discovery component 304 also aggregates asset property data related to the one or more assets (within the network 110 to provide industrial asset data. For instance, in one or more embodiments, the asset discovery component 304 aggregates the asset property data and/or related cybersecurity risk measures into an asset risk assessment signature repository 318 to store the industrial asset data. In an embodiment, the asset discovery component 304 performs the one or more asset discovery processes in response to an action (e.g., a user-initiated action, modification of an interactive graphical element, etc.) initiated via an electronic interface of a computing device associated with a user. In another embodiment, the asset discovery component 304 performs the one or more asset discovery processes in response to an action initiated in response to a timer (e.g., an asset schedule) satisfying a defined timer threshold value. For example, in certain embodiments, the asset discovery component 304 performs the one or more asset discovery processes based on a schedule (e.g., every 30 minutes, every hour, one or more times per day, one or more times per week, etc.). In one or more embodiments, the asset discovery component 304 performs the one or more asset discovery processes based on one or more performance requirements associated with the one or more assets within the network 110. For example, in one or more embodiments, the asset discovery component 304 performs the one or more asset discovery processes based on CPU requirements, memory requirements, a firmware version, and/or other performance requirements associated with the one or more assets within the network 110.

In one or more embodiments, the asset discovery component 304 performs the one or more asset discovery processes with respect to one or more assets in a Level 0 (e.g., zone 0) of the network 110, a Level 1 (e.g., zone 1) of the network 110, and/or a Level 2 (e.g., zone 2) of the network 110. In one or more embodiments, a Level 0 (e.g., zone 0) of the network 110 includes field instrumentation assets associated with technical parameters such as, for example, firmware version/revision, tag name, sensor type, status, manufacturer, communication type, and/or other information. Additionally, a Level 1 (e.g., zone 1) of the network 110 includes embedded IOM's and controllers associated with parameters such as, for example, firmware version/revision, module type, synchronization status, manufacturer, module status, performance data (e.g., CPU performance, memory performance, etc.), and/or other information. Additionally, a Level 1 (e.g., zone 1) of the network 110 includes supervisory/application/network switches nodes asset report associated with parameters such as, for example, model, type, manufacturer, IOS type, mirror port information, up/down ports, memory, CPU, operating system, open TCP, UDP ports, and/or other information.

In one or more embodiments, the asset discovery component 304 generates the industrial asset data by monitoring network traffic broadcasted to the one or more assets. Additionally or alternatively, the asset discovery component 304 generates the industrial asset data based on one or more communications broadcasted by the one or more assets. In one or more embodiments, the asset discovery component 304 generates the industrial asset data by scanning, based on one or more data acquisition protocols associated with the one or more assets, one or more ports (e.g., one or more TCP ports, one or more UDP ports, etc.) of the one or more assets.

In one or more embodiments, the cybersecurity risk mitigation computer system 302 (e.g., the cybersecurity assessment component 306 of the cybersecurity risk mitigation computer system 302) receives a request 320 to perform a cybersecurity assessment of the one or more assets within the network 110. For example, the one or more assets within the network 110 can be set of industrial assets within an industrial control system associated with the network 110. In one or more embodiments, the request 320 includes one or more asset descriptors that describe the one or more assets. For instance, in one or more embodiments, the request 320 includes one or more asset descriptors that describe the edge devices 161a-161n. In an embodiment, the request 320 includes a set of asset descriptors respectively describing an industrial asset from the set of industrial assets. An asset descriptor includes, for example, an asset name, an asset identifier, an asset level, an IP address, a MAC address, a hostname, a manufacturer, an operating system identifier, a TCP port identifier, a UDP port identifier, a service identifier, a role identifier, metadata, an asset state, asset discovery information, a sensor identifier, and/or other information associated with the one or more assets. In certain embodiments, the request 320 can be received in response to a change in the industrial control system, the network 110, and/or one or more assets within the industrial network. In certain embodiments, the request 320 can be received in response to an action performed via an electronic interface of a computing device. For example, a user can initiate the request 320 via an electronic interface of a computing device.

In one or more embodiments, the request 320 includes a request to generate a dashboard visualization associated with the cybersecurity assessment. In one or more embodiments, the request 320 is received in response to an action (e.g., a user-initiated action, modification of an interactive graphical element, etc.) initiated via an electronic interface of a computing device. In one or more embodiments, the request 320 is received in response to an action initiated via a processing unit (e.g., an edge device, a controller, etc.) associated with the one or more assets. In one or more embodiments, the request 320 is received in response to an asset schedule satisfying a defined criterion (e.g., an asset schedule interval being above a threshold timer). In one or more embodiments, the request 320 is received in response to detection of a possible anomaly associated with an asset (e.g., in response to an anomaly index for an asset being greater than a specified threshold level). Additionally or alternatively, in one or more embodiments, the request 320 includes one or more user identifiers describing a user role for a user associated with access of a dashboard visualization. A user identifier includes, for example, an identifier for a user role name (e.g., a manager, an executive, a maintenance engineer, a process engineer, etc.).

In response to the request 320, the cybersecurity assessment component 306 correlates, based on the one or more asset descriptors, the one or more assets to industrial asset data associated with the one or more assets. For example, in response to the request 320, the cybersecurity assessment component 306 correlates, based on the set of asset descriptors, the set of industrial assets to industrial asset data associated with the set of industrial assets. The industrial asset data includes, for example, IP addresses, MAC addresses, hostname data, manufacturer data, operating system data, TCP port data, UDP port data, service data, role data, metadata, flow flags data, port status data (e.g., open state data, closed state data, etc.), asset state data, asset type data, asset discovery information, a timestamp, detected signal strength data associated with an asset communicating on the network, a type of wireless protocol associated with an asset, a networking event associated with an asset, a beacon event associated with an asset, a probing event associated with an asset, an authentication event associated with an asset, and/or other information associated with respective assets.

Additionally, in response to the request 320, the cybersecurity assessment component 306 compares an industrial asset feature set from the industrial asset data to a cybersecurity rules set stored in an asset risk assessment signature repository to determine a cybersecurity threat level indicator for respective assets. For example, in response to the request 320, the cybersecurity assessment component 306 can compare an industrial asset feature set from the industrial asset data to a cybersecurity rules set stored in an asset risk assessment signature repository to determine a cybersecurity threat level indicator for respective industrial assets from the set of industrial assets. The industrial asset feature set can include one or more features related to IP addresses, MAC addresses, hostname data, manufacturer data, operating system data, TCP port data, UDP port data, service data, role data, metadata, flow flags data, port status data (e.g., open state data, closed state data, etc.), asset state data, asset type data, asset discovery information, a timestamp, detected signal strength data associated with an asset communicating on the network, a type of wireless protocol associated with an asset, a networking event associated with an asset, a beacon event associated with an asset, a probing event associated with an asset, an authentication event associated with an asset, and/or other features associated with respective assets.

The cybersecurity rules set can be a set of rules for particular industrial asset features. For example, the cybersecurity rules set can define particular industrial asset features as a certain cybersecurity threat for an industrial control system. Cybersecurity threat level indicators can include, but are not limited to, "critical," "high," "moderate," "low," "cybersecurity threat," "non-cybersecurity threat", etc. Additionally, in some embodiments, particular industrial asset features of varying severity can also be assigned to respective categories classifying the type of cybersecurity threat. For instance, a rule pertaining to a particular industrial asset features can be defined as a "security event" with a cybersecurity event level of "critical," whereas a rule pertaining to another particular industrial asset features can be defined as a "non-security event" with a cybersecurity event level of "low." Additionally and/or alternatively, in various embodiments, the cybersecurity rules set can reflect international cybersecurity standards for industrial networks (e.g., ISA/IEC 62443) and respective cybersecurity threat level indicators can be attributed to rules associated with the international standards.

In certain embodiments, the cybersecurity assessment component 306 can determine the set of asset descriptors based on textual analysis of data provided via an electronic interface of a computing device. For example, the cybersecurity assessment component 306 can determine the set of asset descriptors based on textual analysis of one or more documents related to one or more industrial assets from the set of assets and/or one or more documents related to the industrial control system. In certain embodiments, the cybersecurity assessment component 306 can determine the set of asset descriptors based on a scan of a network topology (e.g., network nodes) associated with the industrial control system. For example, the network topology can illustrate connections and/or a layout of industrial assets within the industrial control system. In certain embodiments, the network topology can provide one or more portions of the industrial asset data. In certain embodiments, the knowledge graphs 251 can define one or more portions of the network topology. In certain embodiments, the cybersecurity assessment component 306 can provide the first industrial asset feature set to a machine learning model (e.g., a machine learning model from the models 142) configured to determine the cybersecurity threat level indicator based on the cybersecurity rules set. The machine learning model can be a classifier model configured to classify a cybersecurity threat level indicator for an industrial assets, a neural network model configured to predict a cybersecurity threat level indicator for an industrial assets, or another type of machine learning model.

Additionally, in response to a determination that that the cybersecurity threat level indicator for the respective industrial assets satisfies a defined criterion, the cybersecurity assessment component 306 can determine one or more cybersecurity countermeasure actions for the respective assets based on a comparison between an industrial asset feature set from the industrial asset data and a predefined industrial asset feature set for a set of predefined assets associated with one or more predefined cybersecurity countermeasures. For example, in response to a determination that that the cybersecurity threat level indicator for the respective industrial assets satisfies a defined criterion, the cybersecurity assessment component 306 can determine one or more cybersecurity countermeasure actions for the respective industrial assets based on a comparison between a second industrial asset feature set from the industrial asset data and a predefined industrial asset feature set for a set of predefined industrial assets associated with one or more predefined cybersecurity countermeasures. In various embodiments, the defined criterion can be related to particular cybersecurity threat levels. For example, the cybersecurity assessment component 306 can determine the one or more cybersecurity countermeasure actions in response to a determination that that the cybersecurity threat level indicator for the respective industrial assets corresponds to a certain type of cybersecurity threat level such as, for example, a "cybersecurity threat" or a "critical" threat level.

In various embodiments, an industrial asset feature set can be configured as one or more data signatures (e.g., one or more digital patterns, one or more digital fingerprints, etc.) that correspond to industrial asset characteristics and/or industrial asset events. Additionally, in various embodiments, a cybersecurity rules set can be configured as one or more data signatures (e.g., one or more digital patterns, one or more digital fingerprints, etc.) that correspond to one or more cybersecurity events and/or one or more cybersecurity risk patterns. The industrial asset feature set associated with the comparison for determining the cybersecurity countermeasure actions can include one or more features related to IP addresses, MAC addresses, hostname data, manufacturer data, operating system data, TCP port data, UDP port data, service data, role data, metadata, flow flags data, port status data (e.g., open state data, closed state data, etc.), asset state data, asset type data, asset discovery information, a timestamp, detected signal strength data associated with an asset communicating on the network, a type of wireless protocol associated with an asset, a networking event associated with an asset, a beacon event associated with an asset, a probing event associated with an asset, an authentication event associated with an asset, and/or other features associated with respective assets. The predefined industrial asset feature set for the set of predefined industrial assets can include predefined IP addresses, predefined MAC addresses, predefined hostname data, predefined manufacturer data, predefined operating system data, predefined TCP port data, predefined UDP port data, predefined service data, predefined role data, predefined metadata, predefined flow flags data, predefined port status data, predefined asset state data, predefined asset type data, predefined asset discovery information, a predefined type of wireless protocol, predefined networking event information, and/or other features associated with the set of predefined industrial assets in order to provide a cybersecurity countermeasure with low cybersecurity risk. The industrial asset feature set associated with the comparison for determining the cybersecurity countermeasure actions can correspond to at least a portion of the industrial asset feature set employed to determine the cybersecurity threat level indicator. Alternatively, the industrial asset feature set associated with the comparison for determining the cybersecurity countermeasure actions can be a different industrial asset feature set than the the industrial asset feature set employed to determine the cybersecurity threat level indicator.

In an embodiment, at least a portion of the cybersecurity rules set and/or the predefined industrial asset feature set for the set of predefined industrial assets is stored in the asset risk assessment signature repository 318. Additionally or alternatively, at least a portion of the cybersecurity rules set and/or the predefined industrial asset feature set for the set of predefined industrial assets is stored in an asset vulnerability signature repository associated with another database (e.g., the memory 312, etc.).

Based on the one or more cybersecurity countermeasure actions, the cybersecurity action component 308 can generate cybersecurity action data 322. For example, in response to a match between the second industrial asset feature set and the predefined industrial asset feature set, the cybersecurity assessment component 306 can determine that the one or more cybersecurity countermeasure actions and the cybersecurity action component 308 can generate the cybersecurity action data 322 based on the one or more cybersecurity countermeasure actions. The cybersecurity action data 322 can include information and/or control signals associated with the one or more cybersecurity countermeasure actions to cause performance of the one or more cybersecurity countermeasure actions associated with the industrial control system. The one or more cybersecurity countermeasure actions can be one or more actions related to the network 110, the industrial control system, one or more assets (e.g., one or more industrial assets), and/or an electronic interface of a computing device.

In certain embodiments, the one or more cybersecurity countermeasure actions includes a predetermined action associated with security control for the industrial control system and/or an asset. In an embodiment, the one or more cybersecurity countermeasure actions includes altering an administrative control with respect to an asset, altering a policy with respect to an asset, alter a configuration setting with respect to an asset, disconnecting a physical hardware device associated with an asset from the industrial control system, increasing a degree of monitoring with respect to an asset, altering strength of authentication with respect to an asset, altering a communication channel associated with an asset, generating a notification to indicate a new asset to replace a particular asset in the industrial control system, and/or one or more other types of actions with respect to an asset.

In an embodiment, the one or more cybersecurity countermeasure actions includes generating a report associated with the cybersecurity assessment. In another embodiment, the one or more cybersecurity countermeasure actions includes generating a user-interactive electronic interface that renders a visual representation of data associated with the cybersecurity assessment. In another embodiment, the one or more cybersecurity countermeasure actions includes disconnecting one or more assets from the network 110. In another embodiment, the one or more cybersecurity countermeasure actions includes providing one or more recommended actions for one or more assets based on the cybersecurity assessment. In another embodiment, the one or more cybersecurity countermeasure actions includes transmitting, to a computing device, one or more notifications associated with the cybersecurity assessment. In another embodiment, the one or more cybersecurity countermeasure actions includes altering one or more portions of the network 110 based on the cybersecurity assessment. In another embodiment, the one or more cybersecurity countermeasure actions includes providing an optimal process condition for an asset based on the cybersecurity assessment. For example, in another embodiment, the one or more cybersecurity countermeasure actions includes adjusting a set-point and/or a schedule for an asset based on the cybersecurity assessment. In another embodiment, the one or more cybersecurity countermeasure actions includes one or more corrective actions to take for an asset based on the cybersecurity assessment. In another embodiment, the one or more cybersecurity countermeasure actions includes providing an optimal maintenance option for an asset based on the cybersecurity assessment. In another embodiment, the one or more cybersecurity countermeasure actions includes an action associated with the application services layer 225, the applications layer 230, and/or the core services layer 235 based on the cybersecurity assessment.

In certain embodiments, the cybersecurity action component 308 provides a dashboard visualization to an electronic interface of a computing device based on the cybersecurity assessment. In one or more embodiments, the dashboard visualization includes data associated with the cybersecurity assessment. In one or more embodiments, the dashboard visualization includes one or more metrics associated with the cybersecurity assessment. In one or more embodiments, the dashboard visualization includes a recommended asset to replace a particular asset in the industrial control system based on the cybersecurity assessment. In certain embodiments, the one or more cybersecurity countermeasure actions includes configuring the dashboard visualization (e.g., based on the cybersecurity assessment) to provide individual control of the one or more assets via the dashboard visualization. In certain embodiments, the one or more cybersecurity countermeasure actions includes configuring the dashboard visualization (e.g., based on the cybersecurity assessment) to facilitate creation of one or more work orders for the one or more assets.

In certain embodiments, the cybersecurity action component 308 can provide a threat level mapping of a network topology associated with the industrial control system based on the one or more cybersecurity countermeasure actions. The threat level mapping can provide one or more indicators for respective industrial assets deemed to be related to a particular cybersecurity threat level. In one or more embodiments, the cybersecurity action component 308 can determine and/or provide asset information for a new industrial asset to replace one or more industrial assets in the industrial control system in response to the determination that the cybersecurity threat level indicator for the respective industrial assets satisfies the defined criterion. In one or more embodiments, the cybersecurity action component 308 can generate an alert for an electronic interface of a computing device in response to the determination that the cybersecurity threat level indicator for the respective industrial assets satisfies the defined criterion. In one or more embodiments, the cybersecurity action component 308 can generate a ranking of cybersecurity countermeasure actions in response to the determination that the cybersecurity threat level indicator for the respective industrial assets satisfies the defined criterion. In certain embodiments, the ranking of cybersecurity countermeasure actions can be ranked according to respective cybersecurity threat levels and/or cybersecurity mitigation recommendations.

Figure 4:
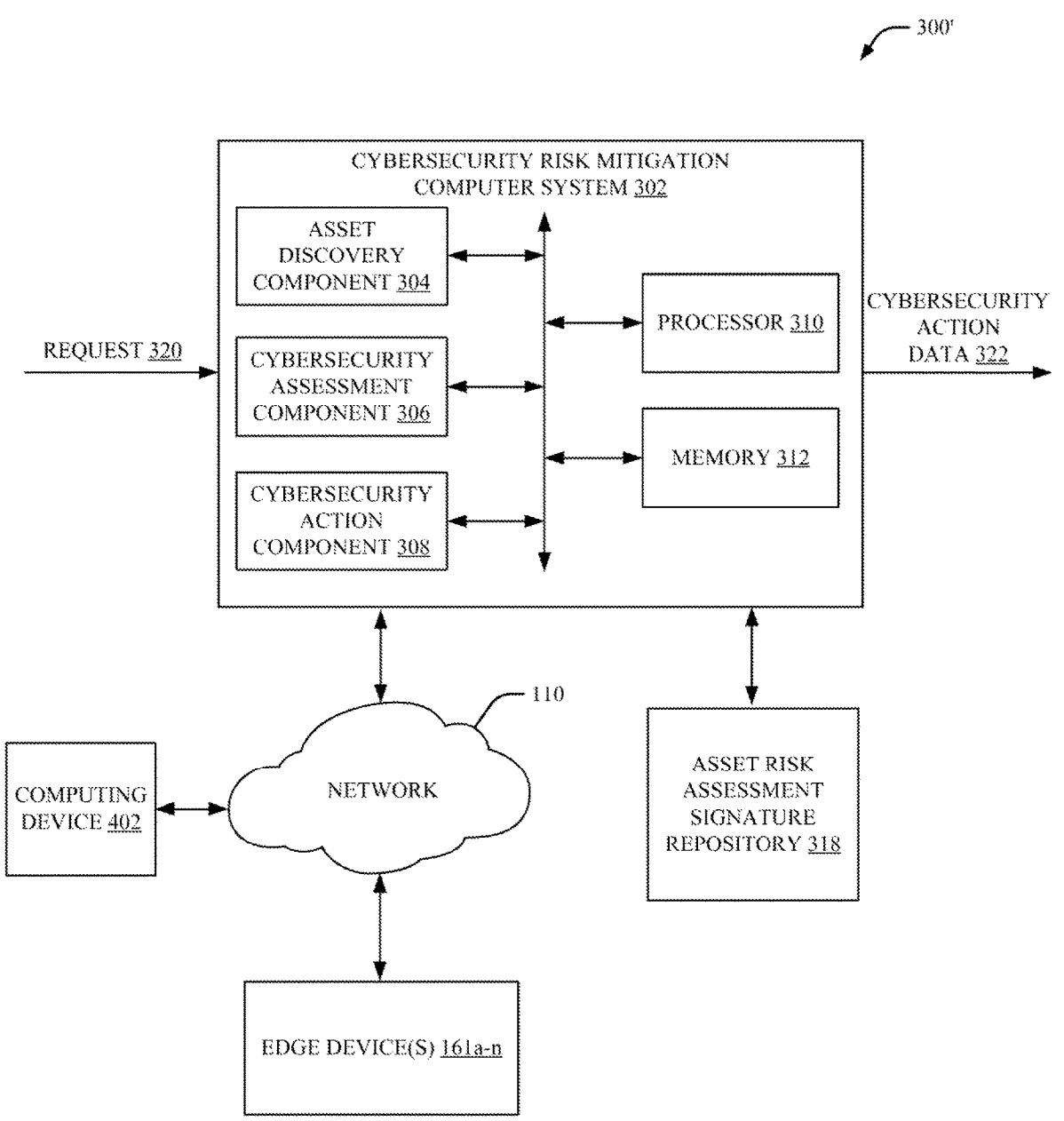
FIG. 4 illustrates another system that provides an exemplary environment, in accordance with one or more embodiments described herein.

FIG. 4 illustrates a system 300' that provides an exemplary environment according to one or more described features of one or more embodiments of the disclosure. In an embodiment, the system 300' corresponds to an alternate embodiment of the system 400 shown in FIG. 4. According to an embodiment, the system 300' includes the cybersecurity risk mitigation computer system 302, the edge devices 161a-161n, the asset risk assessment signature repository 318 and/or a computing device 402. In one or more embodiments, the cybersecurity risk mitigation computer system 302 is in communication with the edge devices 161a-161n and/or the computing device 402 via the network 110. The computing device 402 is a mobile computing device, a smartphone, a tablet computer, a mobile computer, a desktop computer, a laptop computer, a workstation computer, a wearable device, a virtual reality device, an augmented reality device, or another type of computing device located remote from the cybersecurity risk mitigation computer system 302.

In one or more embodiments, the cybersecurity action component 308 communicates one or more portions of the cybersecurity action data 322 to the computing device 402. For example, in one or more embodiments, the cybersecurity action data 322 includes one or more visual elements for a visual display (e.g., a user-interactive electronic interface) of the computing device 402 that renders a visual representation of the data associated with the cybersecurity assessment. In certain embodiments, the visual display of the computing device 402 displays one or more graphical elements associated with the cybersecurity action data 322 (e.g., the data associated with the cybersecurity assessment). In another example, in one or more embodiments, the cybersecurity action data 322 includes one or notifications associated with the cybersecurity assessment. In one or more embodiments, the cybersecurity action data 322 allows a user associated with the computing device 402 to make decisions and/or perform one or more actions with respect to the cybersecurity assessment. In one or more embodiments, the cybersecurity action data 322 allows a user associated with the computing device 402 to control the one or more portions of the one or more assets (e.g., one or more portions of the edge devices 161a-161n). In one or more embodiments, the cybersecurity action data 322 allows a user associated with the computing device 402 to generate one or more work orders for the one or more assets. In one or more embodiments, the cybersecurity action data 322 provides a report associated with the cybersecurity assessment via a display of the computing device 402. In certain embodiments, the report can include a layout visualization of the industrial control system with a visual indicator that identifies particular industrial assets with a particular cybersecurity threat level. In certain embodiments, the visual indicator can be an interactive visual indicator that provides information for a recommended asset to replace the particular industrial asset with the particular cybersecurity threat level.

Figure 5:
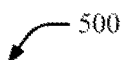
FIG. 5 illustrates an exemplary computing device, in accordance with one or more embodiments described herein.

FIG. 5 illustrates a system 500 according to one or more embodiments of the disclosure. The system 500 includes the computing device 402. In one or more embodiments, the computing device 402 employs mobile computing, augmented reality, cloud-based computing, IoT technology and/or one or more other technologies to provide performance data, video, audio, text, graphs, charts, real-time data, graphical data, one or more communications, one or more messages, one or more notifications, and/or other media data associated with the cybersecurity assessment. The computing device 402 includes mechanical components, electrical components, hardware components and/or software components to facilitate determining prioritized actions and/or one or more metrics associated with the asset data 314. In the embodiment shown in FIG. 5, the computing device 402 includes a visual display 504, one or more speakers 506, one or more cameras 508, one or more microphones 510, a global positioning system (GPS) device 512, a gyroscope 514, one or more wireless communication devices 516, a power supply 518, and/or a computing device system 520.

In an embodiment, the visual display 504 is a display that facilitates presentation and/or interaction with one or more portions of the dashboard visualization data 322. In one or more embodiments, the computing device 402 displays an electronic interface (e.g., a graphical user interface) associated with an asset performance management platform. In one or more embodiments, the visual display 504 is a visual display that renders one or more interactive media elements via a set of pixels. The one or more speakers 506 include one or more integrated speakers that project audio. The one or more cameras 508 include one or more cameras that employ autofocus and/or image stabilization for photo capture and/or real-time video. The one or more microphones 510 include one or more digital microphones that employ active noise cancellation to capture audio data. The GPS device 512 provides a geographic location for the computing device 402. The gyroscope 514 provides an orientation for the computing device 402. The one or more wireless communication devices 516 includes one or more hardware components to provide wireless communication via one or more wireless networking technologies and/or one or more short-wavelength wireless technologies. The power supply 518 is, for example, a power supply and/or a rechargeable battery that provides power to the visual display 504, the one or more speakers 506, the one or more cameras 508, the one or more microphones 510, the GPS device 512, the gyroscope 514, and/or the one or more wireless communication devices 516. In certain embodiments, the dashboard visualization data 322 associated with the cybersecurity assessment is presented via the visual display 504 and/or the one or more speakers 506.

FIG. 6 illustrates a system 600 that provides an exemplary environment according to one or more described features of one or more embodiments of the disclosure. According to an embodiment, the system 600 includes the computing device system 520 to provide a practical application of mitigating cybersecurity threats for an industrial network. In one or more embodiments, the user computing device system 620 provides a practical application of transmitting requests to perform a cybersecurity assessment of assets related the network 110, to mitigate cybersecurity threats associated with the one or more assets, and/or to generate reports detailing the cybersecurity assessment. In one or more embodiments, the computing device system 520 provides a practical application of receiving and rendering reporting data comprising visual representations related to the cybersecurity assessment.

In an embodiment, the computing device system 520 facilitates interaction with the cybersecurity risk mitigation computer system 302. The computing device system 520 includes a communication component 604, an asset device component 606, and/or an electronic interface component 608. Additionally, in one or more embodiments, the computing device system 520 includes a processor 610 and/or a memory 612. In certain embodiments, one or more aspects of the computing device system 520 (and/or other systems, apparatuses and/or processes disclosed herein) constitute executable instructions embodied within a computer-readable storage medium (e.g., the memory 612). For instance, in an embodiment, the memory 612 stores computer executable component and/or executable instructions (e.g., program instructions). Furthermore, the processor 610 facilitates execution of the computer executable components and/or the executable instructions (e.g., the program instructions). In an example embodiment, the processor 610 is configured to execute instructions stored in the memory 512 or otherwise accessible to the processor 610.

The processor 610 is a hardware entity (e.g., physically embodied in circuitry) capable of performing operations according to one or more embodiments of the disclosure. Alternatively, in an embodiment where the processor 610 is embodied as an executor of software instructions, the software instructions configure the processor 610 to perform one or more algorithms and/or operations described herein in response to the software instructions being executed. In an embodiment, the processor 610 is a single core processor, a multi-core processor, multiple processors internal to the user computing device system 620, a remote processor (e.g., a processor implemented on a server), and/or a virtual machine. In certain embodiments, the processor 610 is in communication with the memory 612, the communication component 604, the asset device component 606 and/or the electronic interface component 608 via a bus to, for example, facilitate transmission of data among the processor 610, the memory 612, the communication component 604, the asset device component 606, and/or electronic interface component 608. The processor 610 may be embodied in a number of different ways and, in certain embodiments, includes one or more processing devices configured to perform independently. Additionally or alternatively, in one or more embodiments, the processor 610 includes one or more processors configured in tandem via a bus to enable independent execution of instructions, pipelining of data, and/or multi-thread execution of instructions.

The memory 612 is non-transitory and includes, for example, one or more volatile memories and/or one or more non-volatile memories. In other words, in one or more embodiments, the memory 612 is an electronic storage device (e.g., a computer-readable storage medium). The memory 612 is configured to store information, data, content, one or more applications, one or more instructions, or the like, to enable the computing device system 520 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In one or more embodiments, the communication component 604 is configured to generate the request 320. In various embodiments, the communication component 604 generates the request 320 in response to an action performed with respect to a user interface configuration for an interactive user interface rendered on a visual display via the electronic interface component 608. The action can be, for example, initiating execution of an application (e.g., a mobile application) via a user computing device that presents the interactive user interface, altering an interactive graphical element via the interactive user interface, or another type of action with respect to the interactive user interface rendered via the electronic interface component 608. Additionally or alternatively, in one or more embodiments, the communication component 604 generates the request 320 in response to execution of a user authentication process via a user computing device. For example, in an embodiment, the user authentication process is associated with password entry, facial recognition, biometric recognition, security key exchange, and/or another security technique associated with a user computing device.

In various embodiments, an interactive user interface is configured via the electronic interface component 608 as a dashboard visualization. In one or more embodiments, the request 320 includes a reference to one or more asset device instances that describe one or more respective physical industrial assets in the industrial control system. For instance, in one or more embodiments, the request 320 includes a reference to one or more asset device instances associated with the edge devices 161*a*-161*n* in order to update and/or modify the configuration parameters associated with the edge devices 161*a-n*. In one or more embodiments, the asset device instances comprise metadata related to, but not limited by, asset device identifiers, MAC addresses, IP addresses, hostnames, vendor names, operating system identifiers, data related to networking protocols being employed by the asset devices (e.g., TCP and/or UDP), device status (e.g., "pending," or "under investigation"), historical log data such as timestamp data, identifiers corresponding to various networking devices (e.g., networking switch and/or router addresses) used by the asset device during transmission, port numbers used, and/or other descriptions.

In various embodiments, the communication component 604 is configured to transmit the request 320. In one or more embodiments, the communication component 604 transmits the request 320 to the cybersecurity risk mitigation computer system 302. In one or more embodiments, the communication component 604 transmits the request 320 via the network 110.

In one or more embodiments, in response to the request 320, the communication component 604 and/or the asset device component 606 is configured to receive the cybersecurity action data 322 from the cybersecurity risk mitigation computer system 302. In certain embodiments, the communication component 604 and/or the asset device component 606 incorporates encryption capabilities to facilitate encryption and/or decryption of one or more portions of the cybersecurity action data 322. Additionally, the asset device component 606 can work in conjunction with the electronic interface component 608 to render a visualization associated with the cybersecurity action data 322.

In one or more embodiments, the electronic interface component 608 renders the cybersecurity action data 322 as respective interactive display elements on an interactive user interface. An interactive display element is a portion of the interactive user interface (e.g., a user-interactive electronic interface portion) that provides interaction with respect to a user of the user computing device. For example, in one or more embodiments, an interactive display element is an interactive display element associated with a set of pixels that allows a user to provide feedback and/or to perform one or more actions with respect to the interactive user interface. In an embodiment, in response to interaction with an interactive display element, the interactive user interface is dynamically altered to display one or more altered portions of the interactive user interface associated with different visual data and/or different interactive display elements. Additionally, in one or more embodiments, the electronic interface component 608 is configured to facilitate execution and/or initiation of one or more actions via an interactive user dashboard configured based on the cybersecurity action data 322. In an embodiment, an action is executed and/or initiated via an interactive display element of the interactive user dashboard. In certain embodiments, the interactive user interface presents one or more notifications associated with the prioritized actions related to a cybersecurity assessment related to the cybersecurity action data 322.

Figure 7:
FIG. 7 illustrates an exemplary electronic interface, in accordance with one or more embodiments described herein.

FIG. 7 illustrates an exemplary electronic interface 700 according to one or more embodiments of the disclosure. In one or more embodiments, the electronic interface 700 illustrates a topology for an industrial control system that includes industrial assets associated with a cybersecurity assessment as disclosed herein. For example, the electronic interface 700 can render a visualization for industrial assets 702*a-n* included in an industrial control system that undergoes cybersecurity assessment by the cybersecurity risk mitigation computer system 302. In an example, the cybersecurity assessment component 306 can determine one or more cybersecurity countermeasure actions for the industrial assets 702*a-n* and the cybersecurity action component 308 can generate a visual indicator for the one or more cybersecurity countermeasure actions via the electronic interface 700. For example, the electronic interface 700 can include a visual indicator 704 related to the industrial asset 702*b* in response to a determination by the cybersecurity assessment component 306 that the industrial asset 702*b* is related to a certain cybersecurity threat level. In another example, the electronic interface 700 can include a visual indicator 706 related to a particular connection 708 between two or more industrial assets from the industrial assets 702*a-n* in response to a determination by the cybersecurity assessment component 306 that the connection 708 results in a particular cybersecurity threat for one or more industrial assets from the industrial assets 702*a-n*.

Figure 8:
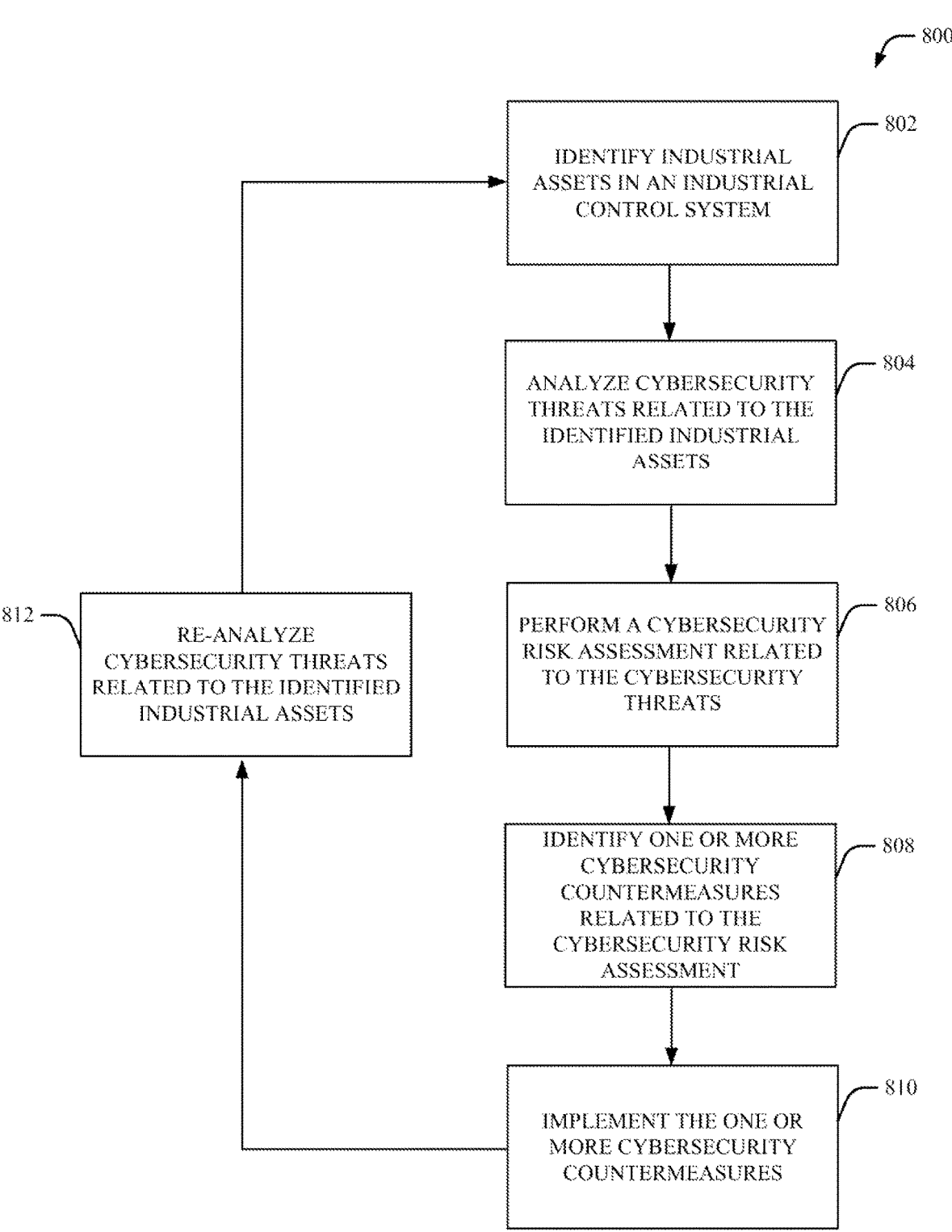
FIG. 8 illustrates an exemplary flow diagram associated with cybersecurity assessment, in accordance with one or more embodiments described herein.

FIG. 8 illustrates an exemplary flow diagram 800 according to one or more embodiments of the disclosure. In one or more embodiments, the flow diagram 800 is related to cybersecurity assessment associated with the cybersecurity risk mitigation computer system 302. The flow diagram 800 includes a step 802 that identifies industrial assets in an industrial control system. At step 804, cybersecurity threats related to the identified industrial assets are analyzed. At step 806, a cybersecurity risk assessment related to the cybersecurity threats is performed. At 808, one or more cybersecurity countermeasures related to the cybersecurity risk assessment is identified. At 810, the one or more cybersecurity countermeasures are implemented. In certain embodiments, at 812, cybersecurity threats related to the identified industrial assets is re-analyzed. In certain embodiment, new industrial assets in the industrial control system can then be identified to provide a new cybersecurity assessment for the industrial control system.

FIG. 9 illustrates a method 900 for cybersecurity risk assessment and mitigation for industrial control systems, in accordance with one or more embodiments described herein. The method 900 is associated with the cybersecurity risk mitigation computer system 302, for example. For instance, in one or more embodiments, the method 900 is executed at a device (e.g., the cybersecurity risk mitigation computer system 302) with one or more processors and a memory. In one or more embodiments, the method 3000 begins at block 902 that receives (e.g., by the cybersecurity assessment component 306) a request to perform a cybersecurity assessment of a set of industrial assets within an industrial control system. In one or more embodiments, the request comprises a set of asset descriptors respectively describing an industrial asset from the set of industrial assets. In certain embodiments, the request is received in response to a change in the industrial control system. In certain embodiments, the request is received in response to an action performed via an electronic interface of a computing device.

At block 904, it is determined whether the request is processed. If no, block 904 is repeated to determine whether the request is processed. If yes, the method 900 proceeds to block 906. In response to the request, block 906 obtains, based on the set of asset descriptors (e.g., by the cybersecurity assessment component 306) the set of industrial assets to industrial asset data associated with the set of industrial assets.

In response to the request, the method 900 additionally or alternatively includes a block 908 that compares (e.g., by the cybersecurity assessment component 306) a first industrial asset feature set from the industrial asset data to a cybersecurity rules set stored in an asset risk assessment signature repository to determine a cybersecurity threat level indicator for respective industrial assets from the set of industrial assets. In certain embodiments, the set of asset descriptors are determined based on textual analysis of data provided via an electronic interface of a computing device. For example, in certain embodiments, the set of asset descriptors are determined based on textual analysis of one or more documents related to one or more industrial assets from the set of assets and/or one or more documents related to the industrial control system. In certain embodiments, the set of asset descriptors are determined based on a scan of a network topology associated with the industrial control system. For example, the network topology can illustrate connections and/or a layout of industrial assets within the industrial control system. In certain embodiments, the network topology can provide one or more portions of the industrial asset data. In certain embodiments, the first industrial asset feature set can be provided to a machine learning model configured to determine the cybersecurity threat level indicator based on the cybersecurity rules set. The machine learning model can be a classifier model configured to classify a cybersecurity threat level indicator for an industrial assets, a neural network model configured to predict a cybersecurity threat level indicator for an industrial assets, or another type of machine learning model.

In response to the request, the method 900 additionally or alternatively includes a block 910 that, in response to a determination that that the cybersecurity threat level indicator for the respective industrial assets satisfies a defined criterion, determines (e.g., by the cybersecurity assessment component 306) one or more cybersecurity countermeasure actions for the respective industrial assets based on a comparison between a second industrial asset feature set from the industrial asset data and a predefined industrial asset feature set for a set of predefined industrial assets associated with one or more predefined cybersecurity countermeasures In response to the request, the method 900 additionally or alternatively includes a block 912 that causes (e.g., by the cybersecurity action component 308) performance of the one or more cybersecurity countermeasure actions associated with the industrial control system. In one or more embodiments, a threat level mapping of a network topology associated with the industrial control system can be provided based on the one or more cybersecurity countermeasure actions. The threat level mapping can provide one or more indicators for respective industrial assets deemed to be related to a particular cybersecurity threat level. In one or more embodiments, asset information for a new industrial asset to replace one or more industrial assets in the industrial control system can be provided in response to the determination that the cybersecurity threat level indicator for the respective industrial assets satisfies the defined criterion. In one or more embodiments, an alert for an electronic interface of a computing device can be generated in response to the determination that the cybersecurity threat level indicator for the respective industrial assets satisfies the defined criterion. In one or more embodiments, a ranking of cybersecurity countermeasure actions can be generated in response to the determination that the cybersecurity threat level indicator for the respective industrial assets satisfies the defined criterion.

FIG. 10 depicts an example system 1000 that may execute techniques presented herein. FIG. 10 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1060 for packet data communication. The platform also may include a central processing unit ("CPU") 1020, in the form of one or more processors, for executing program instructions. The platform may include an internal communication bus 1010, and the platform also may include a program storage and/or a data storage for various data files to be processed and/or communicated by the platform such as ROM 1030 and RAM 1040, although the system 1000 may receive programming and data via network communications. The system 1000 also may include input and output ports 1050 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A system, comprising:
one or more processors;
a memory; and
one or more programs stored in the memory, the one or more programs comprising instructions configured to:
   generate a knowledge graph that defines at least a portion of a network topology for an industrial control system, wherein the knowledge graph defines nodes associated with the set of industrial assets of the industrial control system and links associated with network connections of the industrial control system;
   monitor network traffic broadcasted to a set of industrial assets of the industrial control system to generate industrial asset data associated with the set of industrial assets;
   in response to a detection of a change in the industrial control system based on the network traffic, scan the knowledge graph to determine modeled network topology information for the industrial control system;
   determine a set of asset descriptors respectively describing an industrial asset from the set of industrial assets based on the modeled network topology information;
   correlate, based on the set of asset descriptors, respective industrial assets from the set of industrial assets to respective portions of the industrial asset data associated with the set of industrial assets;
   compare a first industrial asset feature set from the industrial asset data to a cybersecurity rules set stored in an asset risk assessment signature repository to determine a cybersecurity threat level indicator for the respective industrial assets from the set of industrial assets;
   in response to a determination that that the cybersecurity threat level indicator for the respective industrial assets satisfies a defined criterion, determine one or more cybersecurity countermeasure actions for the respective industrial assets based on a comparison between a second industrial asset feature set from the industrial asset data and a predefined industrial asset feature set for a set of predefined industrial assets associated with one or more predefined cybersecurity countermeasures; and
   cause performance of the one or more cybersecurity countermeasure actions associated with the industrial control system.

2. The system of claim 1, the one or more programs further comprising instructions configured to:
   scan the knowledge graph in response to an action initiated via a processing unit associated with the set of industrial assets.

3. The system of claim 1, the one or more programs further comprising instructions configured to:
   determine the set of asset descriptors based on textual analysis of data provided via an electronic interface of a computing device.

4. The system of claim 1, the one or more programs further comprising instructions configured to:
   provide the first industrial asset feature set to a machine learning model configured to determine the cybersecurity threat level indicator based on the cybersecurity rules set.

5. The system of claim 1, the one or more programs further comprising instructions configured to:
   provide a threat level mapping of a network topology associated with the industrial control system based on the one or more cybersecurity countermeasure actions.

6. The system of claim 1, the one or more programs further comprising instructions configured to:
   provide asset information for a new industrial asset to replace one or more industrial assets in the industrial control system in response to the determination that the cybersecurity threat level indicator for the respective industrial assets satisfies the defined criterion.

7. The system of claim 1, the one or more programs further comprising instructions configured to:
   generate an alert for an electronic interface of a computing device in response to the determination that the cybersecurity threat level indicator for the respective industrial assets satisfies the defined criterion.

8. The system of claim 1, the one or more programs further comprising instructions configured to:
   generate a ranking of cybersecurity countermeasure actions in response to the determination that the cybersecurity threat level indicator for the respective industrial assets satisfies the defined criterion.

9. The system of claim 1, the one or more programs further comprising instructions configured to:
   determine the one or more cybersecurity countermeasure actions for the respective industrial assets responsive to a comparison between (i) the cybersecurity threat level indicator for the respective industrial assets and (ii) a predefined cybersecurity threat indicator associated with a particular type of cybersecurity threat level.

10. A computer-implemented method, comprising:
   generating a knowledge graph that defines at least a portion of a network topology for an industrial control system, wherein the knowledge graph defines nodes associated with the set of industrial assets of the industrial control system and links associated with network connections of the industrial control system;
   monitoring network traffic broadcasted to a set of industrial assets of the industrial control system to generate industrial asset data associated with the set of industrial assets;
   in response to a detection of a change in the industrial control system based on the network traffic, scanning the knowledge graph to determine modeled network topology information for the industrial control system;

determining a set of asset descriptors respectively describing an industrial asset from the set of industrial assets based on the modeled network topology information;

correlating, based on the set of asset descriptors, respective industrial assets from the set of industrial assets to respective portions of the industrial asset data associated with the set of industrial assets;

comparing a first industrial asset feature set from the industrial asset data to a cybersecurity rules set stored in an asset risk assessment signature repository to determine a cybersecurity threat level indicator for the respective industrial assets from the set of industrial assets;

in response to a determination that that the cybersecurity threat level indicator for the respective industrial assets satisfies a defined criterion, determining one or more cybersecurity countermeasure actions for the respective industrial assets based on a comparison between a second industrial asset feature set from the industrial asset data and a predefined industrial asset feature set for a set of predefined industrial assets associated with one or more predefined cybersecurity countermeasures; and causing performance of the one or more cybersecurity countermeasure actions associated with the industrial control system.

11. The computer-implemented method of claim 10, wherein the scanning the knowledge graph comprises scanning the knowledge graph in response to an action initiated via a processing unit associated with the set of industrial assets.

12. The computer-implemented method of claim 10, further comprising:

determining the set of asset descriptors based on textual analysis of data provided via an electronic interface of a computing device.

13. The computer-implemented method of claim 10, further comprising:

providing the first industrial asset feature set to a machine learning model configured to determine the cybersecurity threat level indicator based on the cybersecurity rules set.

14. The computer-implemented method of claim 10, further comprising:

providing a threat level mapping of a network topology associated with the industrial control system based on the one or more cybersecurity countermeasure actions.

15. The computer-implemented method of claim 10, further comprising:

providing asset information for a new industrial asset to replace one or more industrial assets in the industrial control system in response to the determination that the cybersecurity threat level indicator for the respective industrial assets satisfies the defined criterion.

16. The computer-implemented method of claim 10, further comprising:

generating an alert for an electronic interface of a computing device in response to the determination that the cybersecurity threat level indicator for the respective industrial assets satisfies the defined criterion.

17. The computer-implemented method of claim 10, further comprising:

determining the one or more cybersecurity countermeasure actions for the respective industrial assets responsive to a comparison between (i) the cybersecurity threat level indicator for the respective industrial assets and (ii) a predefined cybersecurity threat indicator associated with a particular type of cybersecurity threat level.

18. A computer program product comprising at least one computer-readable storage medium having program instructions embodied thereon, the program instructions executable by a processor to cause the processor to:

generate a knowledge graph that defines at least a portion of a network topology for an industrial control system, wherein the knowledge graph defines nodes associated with the set of industrial assets of the industrial control system and links associated with network connections of the industrial control system;

monitor network traffic broadcasted to a set of industrial assets of the industrial control system to generate industrial asset data associated with the set of industrial assets;

in response to a detection of a change in the industrial control system based on the network traffic, scan the knowledge graph to determine modeled network topology information for the industrial control system;

determine a set of asset descriptors respectively describing an industrial asset from the set of industrial assets based on the modeled network topology information;

correlate, based on the set of asset descriptors, respective industrial assets from the set of industrial assets to respective portions of the industrial asset data associated with the set of industrial assets;

compare a first industrial asset feature set from the industrial asset data to a cybersecurity rules set stored in an asset risk assessment signature repository to determine a cybersecurity threat level indicator for the respective industrial assets from the set of industrial assets;

in response to a determination that that the cybersecurity threat level indicator for the respective industrial assets satisfies a defined criterion, determine one or more cybersecurity countermeasure actions for the respective industrial assets based on a comparison between a second industrial asset feature set from the industrial asset data and a predefined industrial asset feature set for a set of predefined industrial assets associated with one or more predefined cybersecurity countermeasures; and cause performance of the one or more cybersecurity countermeasure actions associated with the industrial control system.

19. The computer program product of claim 18, the program instructions further executable by the processor to cause the processor to:

determine the one or more cybersecurity countermeasure actions for the respective industrial assets responsive to a comparison between (i) the cybersecurity threat level indicator for the respective industrial assets and (ii) a predefined cybersecurity threat indicator associated with a particular type of cybersecurity threat level.

20. The computer program product of claim 18, the program instructions further executable by the processor to cause the processor to:

scan the knowledge graph in response to an action initiated via a processing unit associated with the set of industrial assets.

* * * * *